(12) United States Patent
Williams et al.

(10) Patent No.: US 11,331,615 B2
(45) Date of Patent: May 17, 2022

(54) AIR FILTER

(71) Applicants: Steve Williams, Beaumont, CA (US); Jere James Wall, Helendale, CA (US)

(72) Inventors: Steve Williams, Beaumont, CA (US); Jere James Wall, Helendale, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 14/210,678

(22) Filed: Mar. 14, 2014

(65) Prior Publication Data

US 2014/0260982 A1 Sep. 18, 2014

Related U.S. Application Data

(60) Provisional application No. 61/798,377, filed on Mar. 15, 2013.

(51) Int. Cl.
*B01D 46/52* (2006.01)
*B01D 46/24* (2006.01)

(52) U.S. Cl.
CPC ....... *B01D 46/521* (2013.01); *B01D 46/2414* (2013.01); *B01D 2265/06* (2013.01); *B01D 2271/022* (2013.01)

(58) Field of Classification Search
CPC ............ B01D 46/2411; B01D 46/2414; B01D 2271/02; B01D 2271/027; B01D 2201/291; B01D 46/0005; B01D 46/521
See application file for complete search history.

(56) References Cited

U.S. PATENT DOCUMENTS

| 5,487,767 | A | * | 1/1996 | Brown | 55/357 |
| 5,755,843 | A | * | 5/1998 | Sundquist | 55/385.3 |
| 6,171,684 | B1 | * | 1/2001 | Kahlbaugh | B01D 27/06 428/212 |
| 6,602,308 | B1 | * | 8/2003 | Carle et al. | 55/385.3 |
| 2003/0182911 | A1 | * | 10/2003 | Schrage | 55/498 |
| 2005/0229563 | A1 | * | 10/2005 | Holzmann et al. | 55/502 |
| 2007/0175192 | A1 | * | 8/2007 | Niakan | B01D 46/521 55/486 |
| 2007/0240394 | A1 | * | 10/2007 | Ehrenberg | B01D 46/0001 55/498 |
| 2011/0000174 | A1 | * | 1/2011 | Kapelarie et al. | 55/492 |
| 2014/0102058 | A1 | * | 4/2014 | Kaufmann et al. | 55/482 |

* cited by examiner

*Primary Examiner* — Robert Clemente
(74) *Attorney, Agent, or Firm* — Rutan & Tucker LLP; Hani Z. Sayed

(57) ABSTRACT

An air filter including an open end, a closed end, and a filter area there between. The open end frictionally engages and seals an air port, while the closed end mates with the housing to secure the filter to the housing. The filter area is reinforced to provide a durable, reusable filter. The filter material is selected to provide depth loading and increase the particulate capacity of the filter.

1 Claim, 2 Drawing Sheets

AIR FILTER

PRIORITY CLAIM

This application claims priority to the U.S. Provisional Patent Application No. 61/798,377 filed on Mar. 15, 2013, which is incorporated in entirety.

FIELD OF THE INVENTION

The field of the invention is generally related to filter devices. More specifically, the field of the invention is related to vehicle air filters.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and in engines.

Air filters may be used in automobiles, trucks, tractors, locomotives and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally the air intakes of internal combustion engines and compressors tend to use either: paper, foam, or cotton filters. Some filters use an oil bath. Air filters for internal combustion engines prevent abrasive particulate matter from entering the engine's cylinders, where it would cause mechanical wear and oil contamination. In many fuel injected engines, a flat panel pleated paper filter element may be used. This filter is usually placed inside a plastic box connected to the throttle body with ductwork. Vehicles that use carburetors or throttle body fuel injection typically use a cylindrical air filter positioned above the carburetor or throttle body.

Air filters may also be used to filter cabin air, for example, air within a vehicle such as a car, truck, airplane, bus, train, tractor, etc. These air filters may typically be a pleated-paper filter in which outside-air is passed through the filters before entering the vehicle's passenger compartment. Some of these filters are rectangular and similar in shape to the combustion air filter.

SUMMARY OF THE INVENTION

The present invention provides an air filter. Additionally, the present invention may provide an air filter system and methods of using the air filter.

Embodiments as described herein may include an air filter with a first end, a second end, and a filter material between the first end and a second end. The first end may include an opening for connection to a pipe. An interior surface of the opening may be integrally formed with the filter and may be configured to provide a frictional engagement with the inserted pipe. The frictional engagement may be achieved through the compression of the end cap around the inserted pipe. For example, a portion of the interior surface of the opening may radial expand when a pipe is inserted therein. The radial expansion of a portion of the interior surface may compress the interior surface, such that the portion of the interior surface is flattened against an exterior wall of the pipe. According to exemplary embodiments, the interior surface of the end cap may be configured to accommodate the expanded material. For example, the interior surface of the opening may be contoured such that peaks of material may be radially expanded and accommodated by troughs within the material. In an exemplary embodiment, the peaks and troughs are created by one or more ribs of material creating one or more longitudinally spaced rings along the interior surface projecting radially inward toward the center of the filter. An exterior surface of the opening may also be configured to accommodate the expansion of the interior surface. For example, an indentation or other trough may be included on an exterior surface of the end cap to accommodate the radial expansion of the interior surface.

To this end, in an exemplary embodiment, an air filter, comprising: a first end having an opening, an interior surface defining the opening configured to deform and frictionally engage an air inlet; and a filter media coupled to and sealed to the first end.

In another exemplary embodiment, wherein the interior surface is generally cylindrical to create a passage to a cavity surrounded by the filter media.

In another exemplary embodiment, wherein the interior surface is contoured.

In another exemplary embodiment, wherein the interior surface comprises at least 2 circumferential ribs surrounding the opening longitudinally spaced along the opening.

In another exemplary embodiment, wherein the first end comprises a generally planar disk with a central opening, and a rim integrally formed with the generally planar disk extending in an outward longitudinal direction from the generally planar disk circumferentially surrounding the opening.

In another exemplary embodiment, wherein the first end comprises a circumferential indention surrounding the rim.

In another exemplary embodiment, wherein the interior surface comprises at least one peak and one trough so that the peak deforms when contacted by the air inlet.

In another exemplary embodiment, wherein the peak and trough circumferentially surround and define the opening.

In another exemplary embodiment, wherein the at least one peak is a circumferential ring projecting into the opening.

In another exemplary embodiment, further comprises a second end opposite the first end, wherein the second end is closed and the filter media is sealed between the first end and the second end.

In an exemplary embodiment, a method of filtering air, comprising: coupling an air filter to an conduit such that an engagement surface of the air filter is deformed to sealingly engage the air filter to the conduit; and passing a contaminated air stream through a filter media of the air filter.

Still another exemplary embodiment, an air filter, comprising: a first end configured to frictionally engage a conduit to pass a gas stream; a second end opposite the first end; and a filter media between the first end and the second end.

In another exemplary embodiment, wherein the first end is a generally planar circular end, the second end is a generally planar circular end, and the filter material creates a cylindrical filter wall between an edge region of the first end and an edge region of the second end.

In another exemplary embodiment, wherein the first end comprises an interior surface defining an opening through the first end; wherein the interior surface is configured to frictionally engage an inserted conduit.

In another exemplary embodiment, wherein the interior surface comprises at least one projection fully surrounding the opening.

In another exemplary embodiment, wherein the at least one projection is configured to deform to conform to an exterior surface of an inserted conduit.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

It will be understood that the terms "top," "side," and "bottom" used to describe FIGS. 1-7 are intended to provide a frame of reference for purposes of describing embodiments of the air filter. The actual orientation of the air filter in use and the direction of air flow may vary.

DETAILED DESCRIPTION OF THE EMBODIMENTS

In the following description of preferred embodiments, reference is made to the accompanying drawings which form a part hereof, and in which it is shown by way of illustration of specific embodiments in which the invention can be practiced. It is to be understood that other embodiments can be used and structural changes can be made without departing from the scope of the embodiments of this invention.

Although embodiments of the invention may be described and illustrated herein in terms of a cylindrical air filter, it should be understood that embodiments of this invention are not limited to the exact shape illustrated, but rather, include a wide variety of generally cylindrical shapes, generally circular, oval, round, curved, conical, or other closed perimeter shape, that provides a relatively large surface area in a given volume of the filter. Moreover, embodiments as described herein are not limited for use as truck engine filters, but may have applicability in other filtration systems in which a large volume of air needs to be treated.

An air filter including a closed first end and an open second end having filter material around an outer perimeter circumscribing an enclosed cavity is generally disclosed. An air filter in a generally hollow cylindrical form permits air flow through the filter material along the sides of the air filter and directs it through the central passage and through the open end. Thus, the air filter captures particulate and contaminants on an outer surface of the filter for easy cleaning for repetitive use. The filter material may be pleated or otherwise shaped to increase the surface area of the filter material around the outer circumference of the filter. The open end may be shaped to engage a filter housing and seal the filter to the housing and prevent air flow from bypassing the filter material. The closed end may be configured similar to the to open end for ease of manufacturing and similar engagement to an attached housing.

Figure 1:
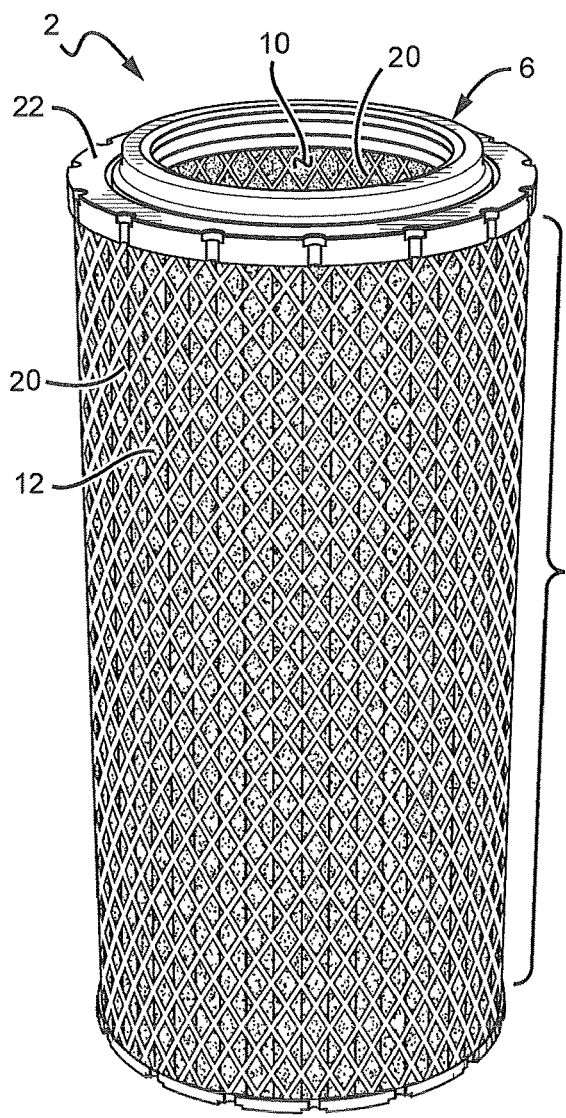
FIG. 1 illustrates a perspective view from a first end of an air filter according to embodiments described herein.
Figure 2:
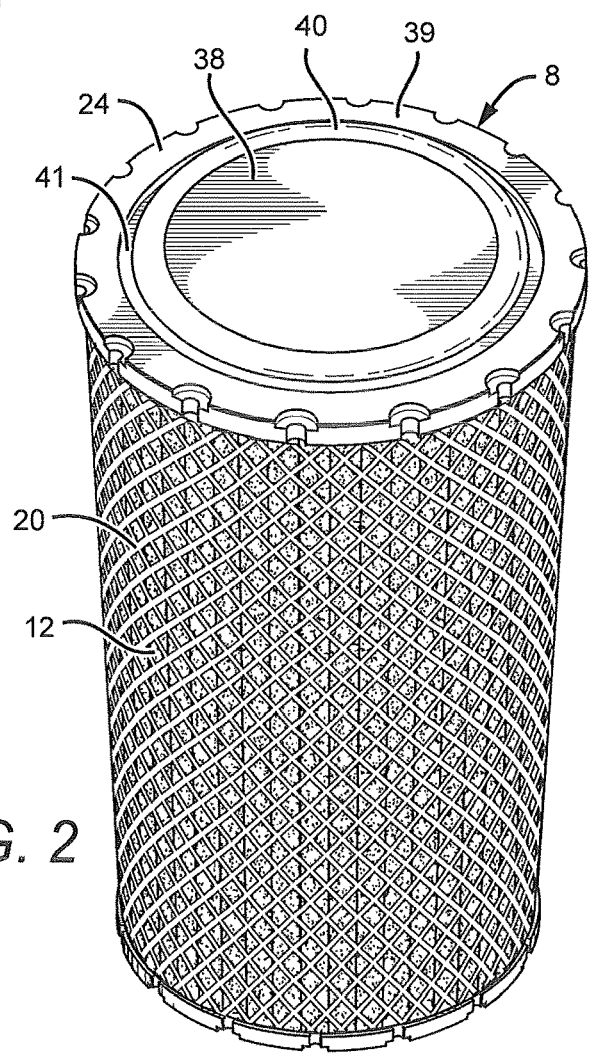
FIG. 2 illustrates a perspective view of a second end of the air filter according to embodiments described herein.
Figure 3:
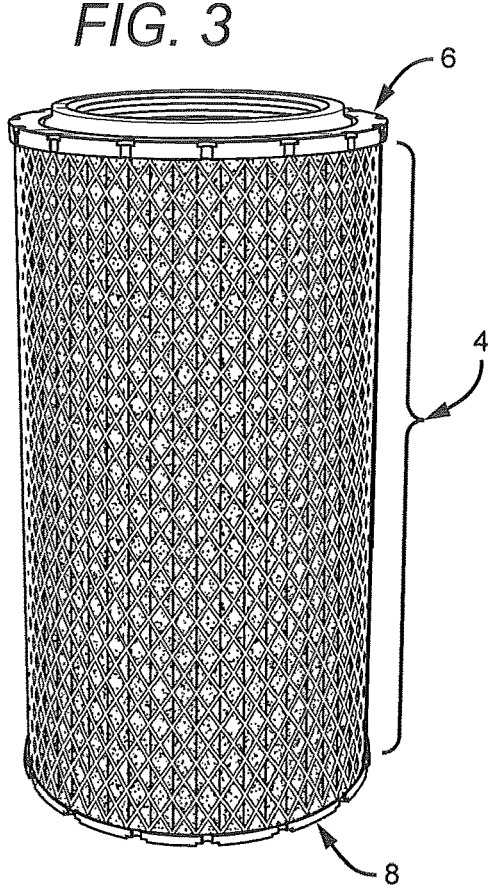
FIG. 3 illustrates a side view of an air filter according to embodiments described herein.

According to embodiments as described herein, an exemplary air filter 2 has a filter area 4, an open end 6, and a closed end 8. As shown in FIG. 1, the filter area 4 is composed of a filter material 12 that circumferentially surrounds an open interior cavity 10 such that the filter material 12 creates an exterior perimeter of at least a portion of the cavity. The exterior cross sectional shape may be generally circular, oval, or otherwise shaped to improve the surface area available for air flow passage for a given volume. The shape may be consistent along a longitudinal length or may vary along the length. For example, the outer profile may taper from one end to the other.

The filter area 4 provides an area to pass an air stream and trap particulates and other contaminates. The filter material may be paper, foam, cotton, spun fiberglass, or other known filter materials, woven or non-woven material, synthetic or natural, or any combination thereof. The filter material may be pleated or otherwise shaped or contoured to increase a surface area for passing the air stream to be cleaned. The length of the filter material 12 in the circumferential direction may be longer than the circular circumference of the filter generally, such that the surface area of the filter material is greater than the profile surface area of the filter.

In an exemplary embodiment, the filter material 12 includes a combination of materials to create a hybrid filter medium. The hybrid air filtration medium is a non-woven synthetic material designed to be used dry with no oil required. Many non-woven mediums have a two-dimensional or "flat" surface. The hybrid filter media according to embodiments described herein comprised lofted non-woven synthetic fibers. This three dimensional platform adds a depth loading feature. Depth loading gives an air filter high airflow with low restriction while providing large dust holding capacities. The hybrid air filtration medium permits a low restriction air filter that could be cleaned almost anywhere and in any way.

Figure 5:
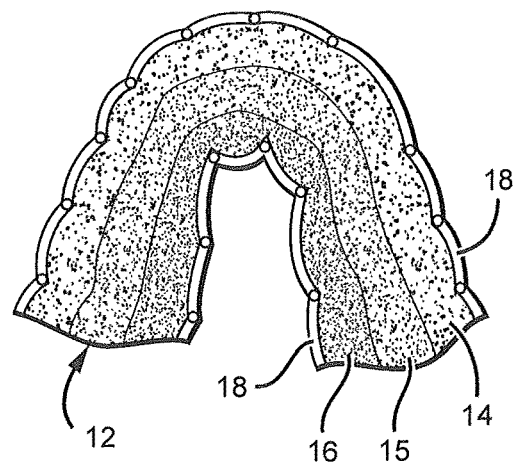
FIG. 5 illustrates an exemplary embodiment of the air filter medium.

As shown in FIG. 5, the hybrid filter medium includes a thick lofted non-woven synthetic media. The material is pleated to increase the surface area available for passing contaminated air. A first material layer 14 may be configured on the side directed toward the incoming air stream to be cleaned, (i.e. the dirty incoming air flow), while a second material layer 15 may be positioned behind the first material layer toward the exit side of the air flow (i.e. the cleaned outgoing air flow). A third layer 16 may be on the air exit side of the second layer 15. The material of each of the layers may include a non-woven synthetic material to promote depth loading of the deposited particulate matter. The first layer 14 may then be lofted to help enhance the depth loading of the particulate material. The lofting may be achieved through pricking, pulling, or otherwise separating fibers of the first layer. The first layer 14 may be very course to capture larger particulate material. As the air flow penetrates deeper into the media, the material may become finer and finer to capture increasingly smaller particulate. Therefore, for example, the material of the third layer 16 may comprises finer separation distances between fibers than that of the first layer 14. The coarseness of the material may be constant for a given layer, or may gradually increase or decrease across the one or more layers.

The disclosed exemplary commercial grade air filters built from a new hybrid filter medium incorporates some of the best characteristics of both cotton and synthetic non-woven technologies. They do not require any oil treatment and use a 3-D lofted filter surface to help reduce air filter restriction while increasing dirt capacity. Less restriction means more power and better engine efficiency. As air filter restriction goes up, an engine needs to expend energy "pulling" air through the filter. This is wasted energy that is no longer available for power at the wheels. Another air flow benefit is achieve each time the air filter is washed, restriction is reduced whereas disposable air filters slowly increase in restriction throughout their service life.

Additional reinforcement may be included to provide additional strength and durability for reusable applications. Therefore, the filter may be cleaned and reused instead of being discarded after each application. For example, the air filter media 12 may be positioned between one or more layers of a reinforcing layer. As shown, a wire screen 18 may be used on an outer and/or inner surface of the filter media. The wire screen 18 may be a powder-coated aluminum screen wire that is co-pleated along with the filter medium to reinforce the media material. Additional or alternate reinforcement may be provided, for example, by an exterior and/or interior cage 20 surrounding the filter media. For example, a criss-crossed steel cage may provide additional reinforcement for the filter media on an interior and exterior surface of the filter. The reinforced medium surrounded by a powder-coated steel cage may withstand the extreme temperatures and pressures that can be present in large turbo diesel applications. The strong and robust reinforced medium 9 may permit the air filter to be used multiple times. For example, the air filter according to embodiments described herein may be used in place of up to 10 or more disposable air filters.

The air filter medium may be selected or configured to provide reversible air flow or uni-directional air flow through the filter. In an exemplary embodiment, the first material layer 14 is positioned on an exterior side of another material layer 16 so that the dirty air enters from an exterior surface through the filter, and travels along the interior cavity and out the open end. The material configuration may be reversed for reverse flow, or may be symmetric or mirrored to provide reversible air flow through the filter.

The filter media 12 including an interior and exterior steel cage 20 is then held between end caps 22 and 24. The end caps may be either rubber or plastic or other deformable material sufficiently strong to support the filter. For example, one or both of the end caps may be molded urethane, foam urethane, or an polyurethane elastomer, and/or may comprise a steel; or aluminum infrastructure. In the exemplary embodiment shown, an elastomer molded polyurethane is used to provide an additional hardness and robust exterior seat for the filter medium. For reusable filters, the molded elastomer is preferable over foam to reduce degradation during the cleaning process.

The first end cap 22 and/or second end cap 24 may be configured to mate with a corresponding surface of an air flow housing 42 to secure the filter relative to the housing. As the air is directed through filter area 4, to increase air flow and improve performance, the space around the filter to the housing should be maintained. The filter is therefore positioned within the housing to maximize the airflow and the end caps are configured to retain the filter in the desired location.

In an exemplary embodiment, the open end is configured to frictionally engage an air flow tube 26. The engagement is also configured to seal the filter to the tube and prevent air from bypassing the filter area 4. The engagement may be ribbed, threaded, or otherwise provide a frictional, sealing engagement between the tube and filter. In an exemplary embodiment, the end cap 22 radially seals the filter to a tube inside the air filter housing 42. The filter may touch the tube and seals to the inside edge of the air filter. The end cap 22 may be configured such that the terminal longitudinally outwardly facing surface 36 of the end cap 22 is separated from the housing 42. In one embodiment, a rubber flange may be fit over the inlet tube. The filter then press fits over the tube, holding it in place. The filter will seal to the tube against the inner lip of the filter's flange and not the base. The frictional engagement may be created through the compression or deformation of the material of the end cap to conform to a surface of the inserted pipe.

Figure 4:
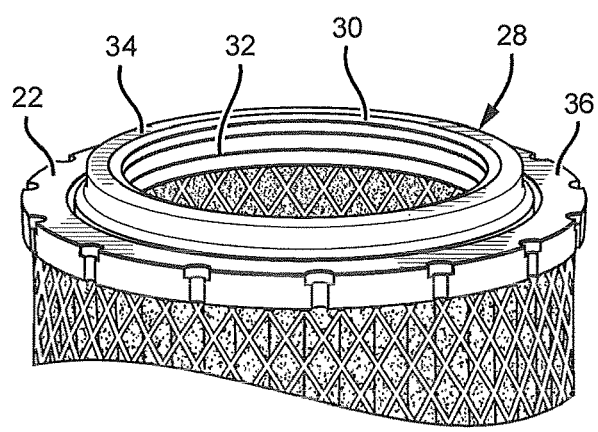
FIG. 4 illustrates a close up of an open end of the air filter according to embodiments described herein.
Figure 6:
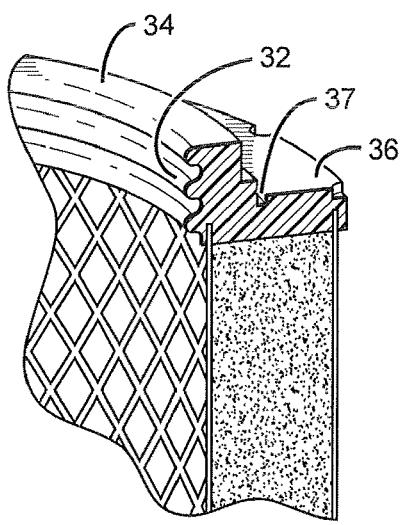
FIG. 6 illustrates a cross section cut away of a first end of an exemplary air filter according to embodiments described herein.
Figure 7:
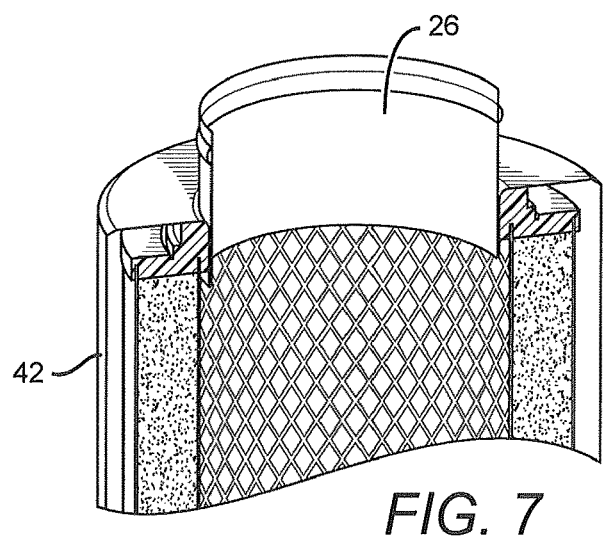
FIG. 7 illustrates the exemplary cross section cut away air filter of FIG. 6 within an exemplary housing according to embodiments described herein.

As shown in FIGS. 4 and 6, the end cap 22 has an opening to pass air from or to the filter interior cavity 10. The end cap 22 includes a rim 28 or projection circumferentially surrounding the opening providing and extended longitudinal interior surface adjacent the opening. This interior surface 30 may be configured to frictionally engage a pipe 26 and seal the filter to the pipe. As shown, the interior surface 30 includes longitudinally spaced ribs 32 or rings along the interior surface 30 projecting inward toward the interior cavity. The peak of the rib 32 engages an exterior surface of the pipe while the troughs permit the peaks to slightly or fully deform or flatten to seal the air filter to the pipe. As seen in FIG. 6, the plurality of ribs 32 may generally form a sinusoidal interior contoured surface such that respective peaks smoothly transition into adjacent troughs and back to the next peak. The peaks may comprise a curved extreme interior end that is configured to deform and flatten when engaged with an inserted air conduit. The curved extreme interior may deform into the space provided by the adjacent trough, thus creating a generally flat interior surface corresponding to the exterior surface of the inserted conduit. The end 34 of the cap 22 may be generally flat and abut a corresponding surface of the housing 42 projecting from the pipe. This end 34 surface may provide an additional sealing engagement to the housing. The rim 28 may also provide a flanged extension to mate with the housing and provide additional support or engagement between the housing and the filter. Thus, the outward facing longitudinal extreme end of the end cap may comprise a stepped terminal end, such that the outer portion of the end cap may be spaced from the filter housing, while the interior portion or terminal end of the rim may comprise one or more engaging surfaces for the filter housing.

A radially exterior portion 36 the end cap 22 may be molded to the filter medium and securely retain the medium in place. The rim 28, ribs 32, or other surface of the end cap 22 may be used as a gasket to seal the filter to the housing and/or pipe. Therefore, additional components that may wear out or require replacement may be reduced or eliminated.

The exterior terminal end surface 36 of end cap 22 may also include one or more expansion devices, thus permitting the end cap to accommodate deformations caused by the temperature fluctuations experienced during use. For example, the exterior terminal end surface 36 may include an indention or trough 37 circumferentially surrounding and adjacent the rim 28. The trough may accommodate material deformations from the inserted pipe 26 as well as from the expansion and contraction of the end cap 22 during use caused by temperature variations.

In an exemplary embodiment, the closed end 8 is configured to mate with the housing 42 and secure the filter to the housing. The end cap 24 may include a radially exterior region 39 that is molded to secure and support the filter medium. An interior region 38 covers the end of the filter and seals the end to force air passage through the air filter area 4. A flange 40 may project from the end cap 24 between the interior region 38 and exterior region 36. The flange may be used to frictionally engage the housing and secure the position of the filter to the housing. The flange may act as a gasket to seal the filter to the housing. The flange may be generally curved in a radial direction, such that the flange is a generally domed circumferential ring. Adjacent the flange 40 on either or both of the interior or exterior side may be an indentation or trough 41 to permit material deformation of the end cap material during use.

The material of the open end 6 and the closed end 8 is sufficiently hard to retain the filter media in the desired configured and support the filter when coupled to the housing, including the pipe. The material is also durable enough for repeated cleaning and use. However, the material provides some flexibility or give so that a frictional engagement may be achieved between the filter and the inserted pipe. The material therefore compresses when the pipe is inserted such that a sealed engagement is achieved between the pipe and filter. The open end cap, integrated into the filter, therefore creates the attachment mechanism for the filter to the pipe, the sealing mechanism, as well as the support for the filter media.

In an exemplary embodiment for use in a diesel truck, the filter has a generally cylindrical shape, is approximately 1-3 feet, and more approximately 2 feet tall, and has an outer diameter of around 6 to 12 inches and approximately 8-10 inches, or 9 inches. The second end cap is closed and comprises three unique regions. The first region is approximately ¼ to ½ of an inch, and preferably ⅜ of an inch thick, and is molded directly to the media pack. This first region is disc shaped and spans the entire end of the media pack to close off the end. The second region is concentric with the first region and extends from the center of the first region axially away from the central interior of the filter. The third region is annular, flat, has a uniform thickness of under approximately ¼ inches and preferably about ⅛ of an inch, and sits on the outside surface of the first region opposite the central interior of the filter. The second region includes a rounded annular ridge at its outer rim that is approximately 5 to 10 inches or approximately 7 inches in diameter from peak to peak, with the peaks extending about ¼ to ¾ inches and preferably approximately ½ an inch further axially away from the thick first region. The entire outer surface of the second region, including its generally flat center, is axially further away from the central interior of the filter than the first region, and is outside of the ends of the media pack. The third region is concentric with the first and second regions; however, the third region is located along the outer rim of the first region radially outside of the second region. The third region has an inner diameter of about 5 to 10 inches and preferably approximately 7.5 inches and an outer diameter of about 7 to 15 inches, or 7 to 11 inches, or approximately 9 inches. The first region connects to the second region and the third region, but the second and third regions do not touch or directly connect to each other. None of these regions includes any projections into the central open interior.

Embodiments as described herein are very robust, which means they may be repeatedly cleaned and reused. The filters may be cleaned with or without a degreasing agent, and pressure washed, compress air blown, or water sprayed to remove the built up particulate, including dirt and grime from the filter material. The potential reuse of the filter reduces the cost of replacing air filters. The depth-loading of the filter material may be washable. Because of the fitted end caps, the air filter is removable from the housing to permit replacement, servicing, and cleaning of the filter. Moreover, when restriction builds beyond a desired level, the filter may simply be washed. So instead of short cycling expensive disposable air filters, embodiments according to the present description keep restriction down and horsepower up.

It will be understood that the terms "top," "side," and "bottom" used herein are intended to provide a frame of reference for purposes of describing embodiments of the air filter. The actual orientation of the air filter in use and the direction of air flow may vary. In additional, the recitations to a first, second, or more components is intended not to require a specific number or location of a specific component, but merely used as a distinguishing reference from One component to another.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. The disclosed filter is exemplary only including one or more features of the present invention. The disclosed features may be repeated, duplication, removed, reconfigured, repositioned, or otherwise modified and remain within the present disclosure.

Thus, specific embodiments and applications of air filters have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refers to at least one of something selected from the group consisting of A, B, C, . . . and N, the text should be interpreted as requiring only one element from the group, not A plus N, or B plus N, etc.

We claim:

1. A method of filtering air, comprising:
   coupling an air filter comprising an opening to a conduit such that an engagement surface of the air filter is deformed to sealingly engage the air filter to the conduit;
   the air filter further comprising an interior surface having one or more longitudinally spaced rings along the interior surface projecting radially inward toward the center of the filter, wherein the one or more longitudinally spaced rings of the interior surface are configured to retain the first end in an unengaged configuration and an engaged configuration that is opposite from the unengaged configuration the rings forming a sinusoidal interior contoured surface in the unengaged configuration, the sinusoidal interior contoured surface comprising a plurality of peaks wherein the peaks smoothly transition into adjacent troughs and back to the next peak in the unengaged configuration, the peaks comprising a plurality of curved interior ends in the unengaged configuration, wherein the one or more longitudinally spaced rings of the interior surface of the retained first end are engaged with an exterior surface of an inserted air conduit in the engaged configuration, such that the peaks and adjacent troughs that form the sinusoidal interior contoured surface of the rings are deformed and flattened to create a generally flat interior surface for the retained first end in the engaged configuration, and wherein the generally flat interior surface of the retained first end corresponds and is substantially parallel to that exterior surface of the inserted air conduit; a second end opposite the first end, wherein the second end is closed and the filter media is sealed between the first end and the second end, wherein the second end comprises an expansion device configured so as to accommodate deformations caused by temperature fluctuations;

a filter media coupled to and sealed to the first end, the filter media comprising a plurality of material layers, wherein at least one layer is lofted to enhance depth loading, and further wherein the length of the filter material in a circumferential direction is longer than the circumference of the air filter;

including a first material layer comprising a plurality of fibers is lofted to enhance depth loading, a second material layer positioned behind the first material layer toward an exit side of air flow, and a third material layer disposed on an air exit side of the second material layer, the third material layer comprising finer separation distance between fibers than that of the first material layer;

a flange that projects from the second end, the flange configured as a domed circumferential ring; and passing a contaminated air stream through a filter media of the air filter.

* * * * *